US009187031B1

(12) United States Patent
Ovenshire et al.

(10) Patent No.: US 9,187,031 B1
(45) Date of Patent: Nov. 17, 2015

(54) TAIL LIGHT ASSEMBLY FOR A VEHICLE

(71) Applicant: GM GLOBAL TECHNOLOGY OPERATIONS LLC, Detroit, MI (US)

(72) Inventors: Jay H. Ovenshire, Rochester, MI (US); Benjamin P. Zavala, Cincinnati, OH (US); Martin J. Davis, Royal Oak, MI (US)

(73) Assignee: GM Global Technology Operations, Detroit, MI (US)

( * ) Notice: Subject to any disclaimer, the term of this patent is extended or adjusted under 35 U.S.C. 154(b) by 0 days.

(21) Appl. No.: 14/313,019

(22) Filed: Jun. 24, 2014

(51) Int. Cl.
*B60Q 1/00* (2006.01)
*B60Q 1/26* (2006.01)
*B60Q 1/44* (2006.01)
*B60Q 1/38* (2006.01)
*B60Q 1/14* (2006.01)

(52) U.S. Cl.
CPC ............. *B60Q 1/2607* (2013.01); *B60Q 1/14* (2013.01); *B60Q 1/26* (2013.01); *B60Q 1/38* (2013.01); *B60Q 1/44* (2013.01)

(58) Field of Classification Search
CPC .......... B60Q 1/34; B60Q 1/2696; B60Q 1/38; B60Q 11/007; B60Q 1/2603; B60Q 1/30; B60Q 1/00; B60Q 1/26; B60Q 1/14; F21S 48/215; F21S 48/218; F21S 48/2225; F21S 48/328; F21Y 2101/02; Y10S 362/80
USPC ................... 340/463, 465, 478, 545; 315/77; 362/511, 545
See application file for complete search history.

(56) References Cited

U.S. PATENT DOCUMENTS

| 4,556,862 | A | * | 12/1985 | Meinershagen | 340/478 |
| 5,373,280 | A | * | 12/1994 | Louy et al. | 340/425.5 |
| 7,002,458 | B2 | * | 2/2006 | Su | 340/465 |
| 7,963,685 | B2 | * | 6/2011 | Kowalczyk et al. | 362/545 |
| 8,480,272 | B2 | * | 7/2013 | Day | 362/487 |
| 2013/0127340 | A1 | * | 5/2013 | Huhn et al. | 315/77 |
| 2013/0127612 | A1 | * | 5/2013 | Stadler et al. | 340/465 |

OTHER PUBLICATIONS http://www.gizmag.com/audi-sequential-lighting-turn-signal/28731/; Darren Quick; "Audi turns to sequential lighting indicators"; gizmag 2014 Detroit Motor Show highlights; Aug. 15, 2013.

* cited by examiner

Primary Examiner — Vibol Tan
(74) Attorney, Agent, or Firm — Quinn Law Group, PLLC

(57) ABSTRACT

A tail light assembly includes a lighting assembly and a control board. The lighting assembly includes a base plate and a plurality of light-emitting diodes (LEDs). The control board is electrically connected to each of the LEDs. The control board receives an activation signal from a device. In response, the control board sequentially sends an illumination signal to LEDs of each of a plurality of groups of LEDs to thereby sequentially illuminate the groups of LEDs. The control board also selectively and sequentially sends a termination signal to LEDs of the various groups of LED, in alternating relationship to sending the illumination signal. The sequential illumination and turning off of the plurality of LEDs simulates motion of waves propagating across the base plate.

18 Claims, 5 Drawing Sheets

TAIL LIGHT ASSEMBLY FOR A VEHICLE

TECHNICAL FIELD

The present disclosure is related to a tail light assembly for a vehicle.

BACKGROUND

Vehicles include exterior lights, including tail lights, turn signals, rear fog lamps, a center high mount stop light (CHMSL), and the like. These exterior lights are configured to be illuminated to make the vehicle visible.

SUMMARY

One possible aspect of the disclosure, a tail light assembly includes a lighting assembly and a control board. The lighting assembly includes a base plate and a plurality of light-emitting diodes (LEDs) that are configured to be selectively illuminated and turned off to simulate motion of waves propagating across the base plate.

The base plate presents an attachment surface. The LEDs are arranged on the attachment surface. The control board is electrically connected to each of the LEDs. The control board is operable for receiving an activation signal from a device and then sending an illumination signal to each LED of a first group of the plurality of the LEDs to thereby illuminate the first group of the LEDs. The illumination of the first group of the LEDs meets at least one of a luminous lens area requirement and a photometric requirement. The control board then sends an illumination signal to each LED of a second group of the plurality of the LEDs to thereby illuminate the second group of the LEDs. Next, the control board is configured to send a termination signal to at least one of the LEDs of the first group of the LEDs, subsequent to the illumination of the second group of the LEDs. As such, at least one of the LEDs of the first group of the LEDs is turned off and remaining illuminated LEDs continue to meet at least one of the luminous lens area requirement and the photometric requirement.

In another aspect of the disclosure, a method of illuminating a plurality of LEDs is provided. The method includes receiving an activation signal from a device and then sending an illumination signal to each LED of a first group of the plurality of the LEDs to thereby illuminate the first group of the LEDs. The illumination of the first group of the LEDs meets at least one of a luminous lens area requirement and a photometric requirement. Next, an illumination signal is sent to each LED of a second group of the plurality of the LEDs to thereby illuminate the second group of the LEDs. Then, a termination signal is sent to at least one of the LEDs of the first group of the LEDs, subsequent to the illumination of the second group of the LEDs. As such, at least one of the LEDs of the first group of the LEDs is turned off and remaining illuminated LEDs continue to meet at least one of the luminous lens area requirement and the photometric requirement.

In yet another aspect of the disclosure, another method of illuminating a plurality of the LEDs is provided. The method includes recording at least one predetermined lighting sequence in a memory, receiving an activation signal from a device, and then sending an illumination signal to a first group of the plurality of the LEDs to thereby illuminate the first group of the LEDs. The illumination of the first group of the LEDs meets at least one of a luminous lens area requirement and a photometric requirement. Next, a subsequent illumination signal is sent to a second group of the plurality of the LEDs to thereby illuminate the second group of the LEDs. Then, a termination signal is sent to at least one of the LEDs of the first group, subsequent to the illumination of the second group. As such, at least one of the LEDs of the first group is turned off and remaining illuminated LEDs continue to meet at least one of the luminous lens area requirement and the photometric requirement. Next, another subsequent illumination signal is sent to a third group of the LEDs to thereby illuminate the LEDs of the third group, after the illumination signal is sent to the second group of LEDs. A subsequent termination signal is sent to at least one of the LEDs of at least one of the first group and the second group, subsequent to the illumination of the LEDs of the third group. As such, at least one of the LEDs of at least one of the first group and the second group is turned off and the remaining illuminated LEDs continue to meet at least one of the luminous lens area requirement and the photometric requirement.

The above features and advantages and other features and advantages of the present teachings are readily apparent from the following detailed description of the best modes for carrying out the present teachings when taken in connection with the accompanying drawings.

DETAILED DESCRIPTION

Figure 1:
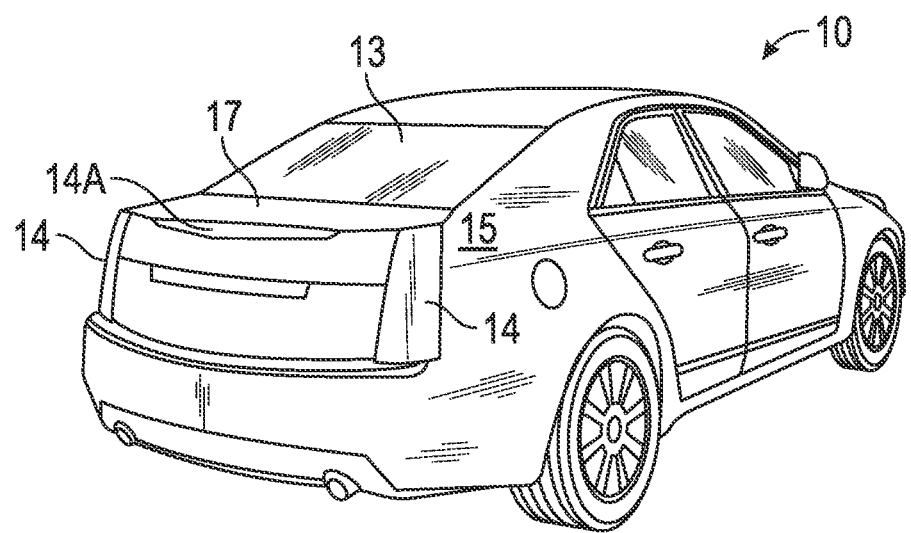
FIG. 1 is a schematic perspective view illustration of an example vehicle having tail light assembly as described herein.

Referring to the drawings, wherein like reference numbers refer to the same or like components in the several Figures, and beginning with FIG. 1, an example vehicle 10 includes a body 15 and a plurality of external vehicle lighting assemblies 30, each positioned with respect to the body 15. The lighting assemblies 30 include a set of tail light assemblies 14. One or more additional tail light assemblies 14A may be positioned at the rear of the vehicle 10 for added visibility, for instance above or below a rear window 13 or adjacent to a trunk lid 17, with the latter example shown in FIG. 1.

The vehicle 10 may include a controller 50 (see FIG. 10) that can be programmed to control the illumination of each of a plurality of individually-addressable light-emitting-diodes (LEDs) 20 within each of the tail light assemblies 14 in order, simulate motion, e.g., motion of waves propagating, and/or control the level of brightness within the tail light assemblies 14. As illustrated in FIGS. 3-8, this motion may be simulated through programmed and/or customizable lighting sequences which may be performed via the tail light assemblies 14. The lighting sequence(s) is controlled in response to actuation of a device 22, e.g., a turn signal switch, a brake pedal switch, and the like. A method 100 for using the presently disclosed tail light assembly 14 is set forth below with reference to FIG. 11.

Figure 2:
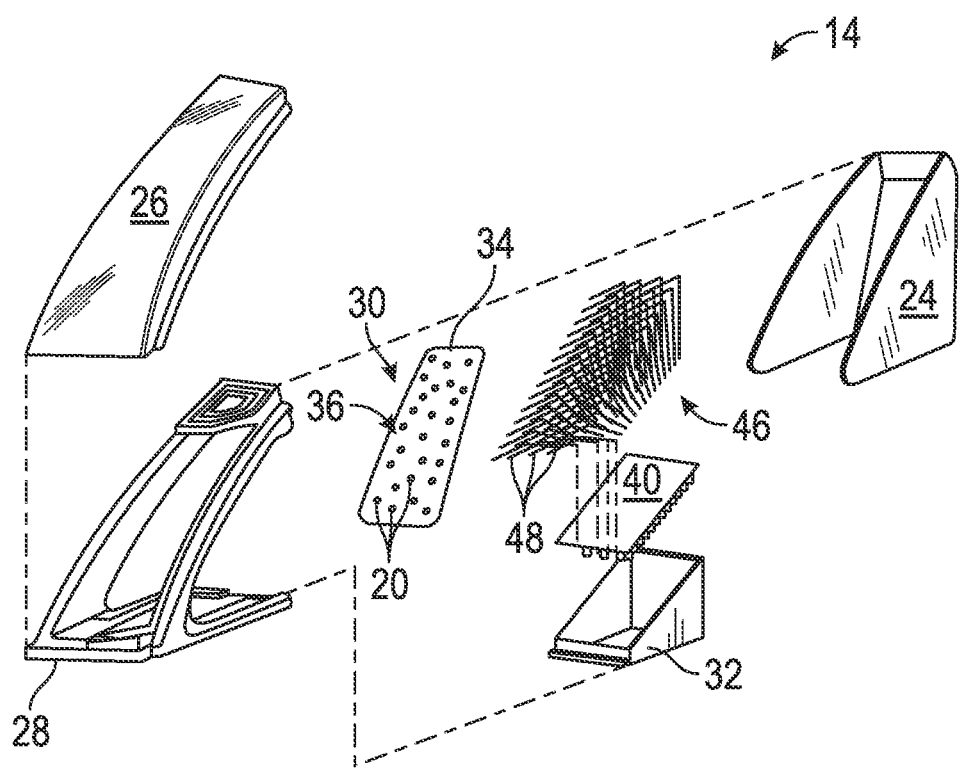
FIG. 2 is a schematic exploded view illustration of the tail light assembly shown in FIG. 1.
Figure 3:
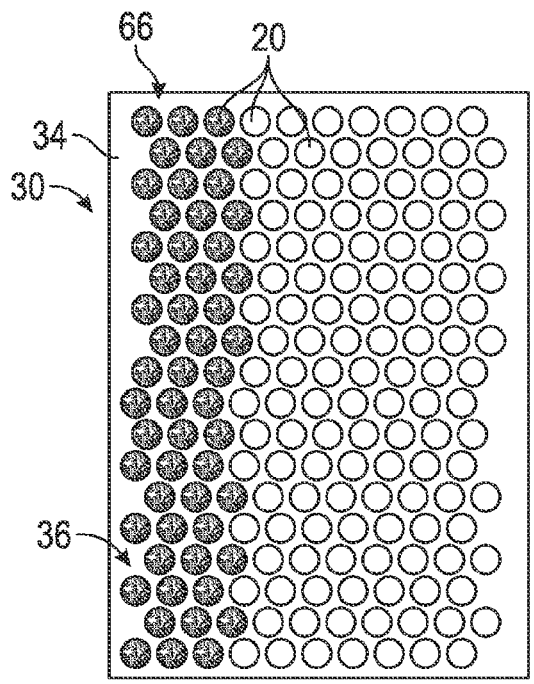
FIGS. 3-8 are schematic illustrative rear views of a sequence of illuminating a plurality of light-emitting-diodes (LEDs) of a lighting assembly of the tail light assembly.

Referring to FIG. 2, each tail light assembly 14 may include a housing 24, an outer lens 26, a bezel 28, a lighting assembly 30, and a control carrier 32. The housing 24 is constructed of a suitable material such as plastic or metal. The outer lens 26 is typically constructed of colored transparent or translucent plastic, which is typically red in color. However, it should be appreciated that the outer lens 26 may be constructed out of materials having different colors and/or materials.

The outer lens 26 may be configured to cover the housing 24 such that the housing 24 and the outer lens 26 encapsulates, i.e., fully surrounds and encloses, main lighting components, which may include the lighting assembly 30. The lighting assembly 30 includes a base plate 34 and a plurality of the LEDs 20. The LEDs 20 may be configured with or without a phosphor coating so as to emit white light, may be mounted and arranged in two dimensions on the base plate 34.

The base plate 34 includes an attachment surface 36 and the LEDs 20 are arranged on the attachment surface 36. The shape and size of each base plate 34 may vary depending on the particular design of the tail light assembly 14, which may be horizontally oriented as shown in FIGS. 2-8 or oriented to be roughly equal in both the vertical and horizontal directions, and the like. Alternatively, with reference to FIG. 9, the base plate 34 may have a continuous, non-linear perimeter 38 that undulates to form an amorphous shape, i.e., an amoeba-shape. It should be appreciated that the base plate 34 may have other shapes as well.

Figure 6:
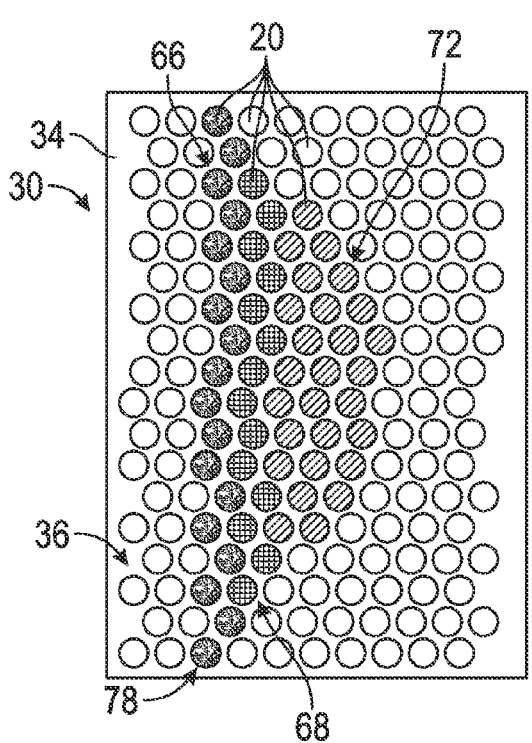
Figure 7:
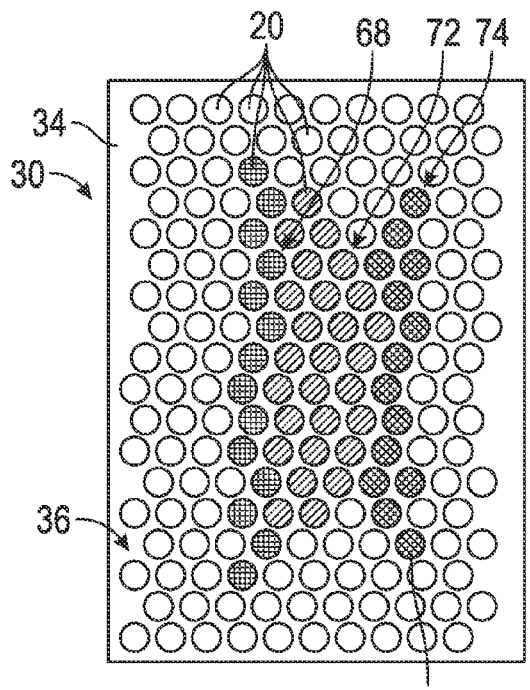
Figure 8:
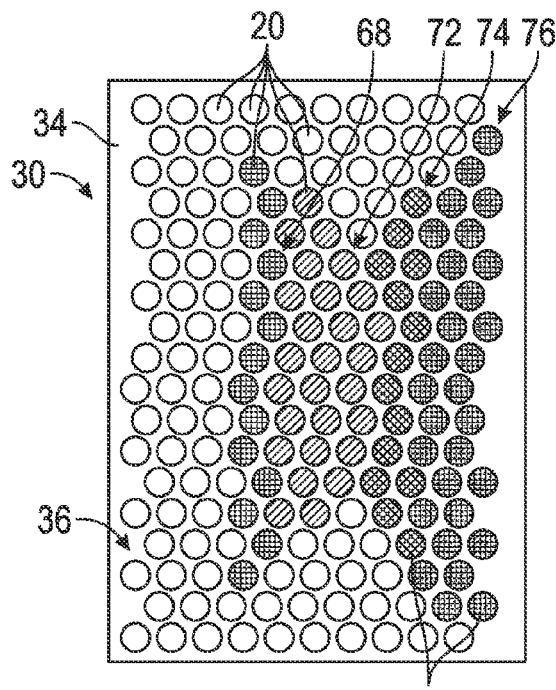
Figure 9:
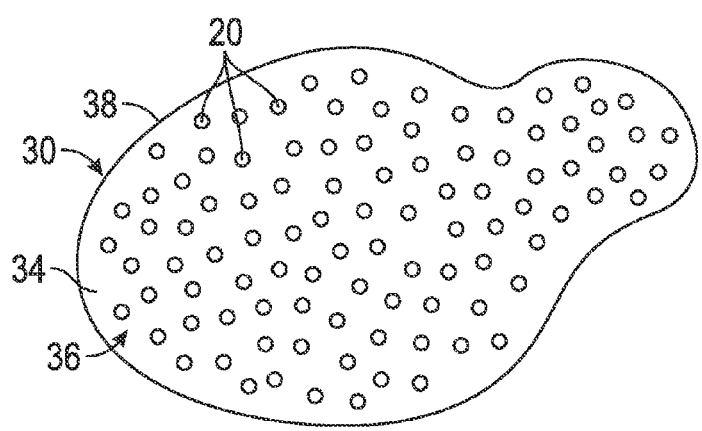
FIG. 9 is a schematic illustrative rear view of another embodiment of a base plate of the lighting assembly of the tail light assembly, with the base plate presenting an amorphous shape.

The base plate 34 of FIG. 6-8 is horizontally oriented with the LEDs 20 arranged in an amorphous pattern on the attachment surface 36. Referring to FIG. 9, the base plate 34 is amoeba-shaped with the LEDs 20 arranged in an amorphous pattern on the attachment surface 36. It should be appreciated, however, that the LEDs 20 may be arranged on the base plate 34 to provide any desired LED 20 pattern on the attachment surface 36.

Figure 10:
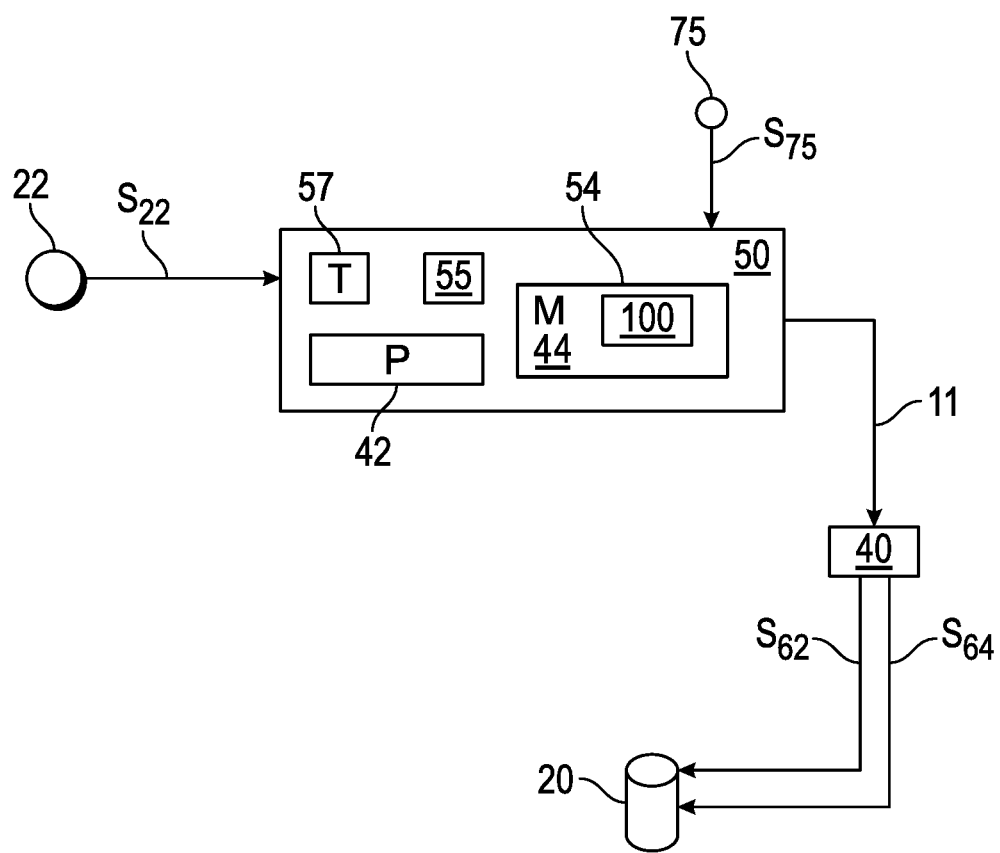
FIG. 10 is a schematic illustration of a controller for the lighting assembly of FIGS. 1 and 2.

The LEDs 20 on each base plate 34 may be individually-addressable by a control board 40, which is shown in FIGS. 2 and 10. The control board 40 may include a processor 42 and instructions 44. In response to the receipt of an activation signal (arrow $S_{22}$) from the controller 50, the control board 40 may execute the instructions 44 via the processor 42 to cause the control board 40 to individually address the LEDs 20. This allows the lighting assembly 30 to selectively display a desired dynamic lighting sequence, visible through the outer lens 26. The activation signal (arrow $S_{22}$) may be sent in response to activation of a turn signal switch, activation of a brake switch, and the like.

Referring to FIG. 2, the lighting assembly 30 is positioned between the outer lens 26 and the housing 24, where the bezel 28 may support the outer lens 26. All of the internal components of the tail light assembly 14 may be received within the bezel 28 and/or the housing 24, where the bezel 28 is constructed of plastic or another suitable material. The brake lighting assembly 30 should be oriented such that all of the LEDs 20 are fully visible and are illuminatable with a required light intensity, i.e., a luminous lens area requirement (LLAR) and/or a photometric requirement, during braking, driving, signaling of turns, and the like. With continued reference to FIG. 2, the tail light assembly 14 is shown in exploded view for additional detail. The outer lens 26 and the housing 24 contain the various components therein, with the bezel 28 positioned adjacent to the outer lens 26.

The control carrier 32 may be constructed of molded plastic or any suitable material. The control carrier 32 may be received by the bezel 28 of the housing 24. In turn, the control carrier 32 supports the control board 40 for the lighting assembly 30. A wiring array 46 electrically connects the LEDs 20 to the control board 40. The wiring array 46 includes a plurality of wires 48, where each wire is soldered or otherwise operatively connected to the control board 40 and routed with respect to the lighting assembly 30. Each LED 20 in the lighting assembly 30 is individually-addressable by the control board 40 via the transmission of signals over one or more of the wires 48 to command the desired lighting sequence. This feature may allow a wide variety of unique lighting displays to be executed by the controller 50.

Referring to FIG. 10, the controller 50 may be used to control a lighting sequence of the LEDs 20 of the tail light assembly 14 of the vehicle 10 of FIG. 1. The control functions may be pre-programmed by the manufacturer. In an embodiment employing the controller 50, a processor 42, tangible, non-transitory memory 54, and a transceiver 57 may be positioned on a printed circuit board or otherwise sufficiently housed. Instructions 44 embodying 15 the method 100 for using the above-described tail light assembly 14 may be stored in the memory 54 and executed via the processor 42 to provide the functionality described herein. Alternatively, the method 100 may be stored in memory 54 located on the control board 40.

The memory 54 may include read only memory (ROM), optical memory, flash memory 54, and the like. Transitory memory such as random access memory (RAM) and electrically-erasable programmable read-only memory (EEPROM) may also be included as needed, along with other required circuitry 55 including but not limited to a high-speed clock (not shown), analog-to-digital (A/D) circuitry 55, digital-to-analog (D/A) circuitry 55, a digital signal processor 42, and any necessary input/output (I/O) devices 22 and other signal conditioning and/or buffer circuitry 55. The controller 50 may be in communication with the device 22, a main lighting control sensor 75, and an override sensor 58.

In a possible scenario, a user of the vehicle 10 of FIG. 1 may activate the device 22, for instance the turn signal switch. Activation of the device 22 via actuation by the user, or alternatively passive actuation of the device 22 by the controller 50, may result in transmission of the activation signal (arrow $S_{22}$). Receipt of the activation signal (arrow $S_{22}$) by the transceiver 57 can command the processor 42 to initiate a previously recorded lighting sequence, either for a calibrated duration or until the switch is deactivated.

The main lighting control sensor 75 may be any sensor used in the normal operation of the main lighting assembly 30 being used. For instance, in keeping with the tail light assembly 14 example, the main lighting control sensor 75 may be either or both of a brake pedal force or travel sensor and a turn signal position sensor. The main light control sensor 75 is configured to send an output signal (arrow $S_{75}$) to the controller 50 or directly to the control board 40, with at least one of the LEDs 20 illuminating in response to the received output signal (arrow $S_{75}$).

In all of these possible embodiments, the control board 40 remains in communication with each of the LEDs 20. In turn, the controller 50 may send a sequence signal (arrow 11) to the control board 40 such that the control board 40 selectively sends illumination signals (arrow $S_{62}$) and/or termination signals (arrow $S_{64}$) to the LEDs 20, per the recorded lighting sequence.

By way of a non-limiting example, a portion of an exemplary lighting sequence of the LEDs 20 is illustrated in FIGS. 3-8. With specific reference to FIG. 3, when the activation signal (arrow $S_{22}$) is received by the control board 40, the lighting sequence may initiate, whereby the control board 40 sends an initial illumination signal (arrow $S_{62}$) to each of the LEDs 20 of a first group 66 of LEDs 20. In response to receiving the initial illumination signal (arrow $S_{62}$), each of the LEDs 20 of the first group 66 illuminates. The number of the LEDs 20 initially illuminated may be sufficient to meet the luminous lens area requirements and/or the photometric requirements. The luminous lens area requirements (LLAR) may be an area of an orthogonal projection of an effective light-emitting surface of the illuminated LEDs 20 on a plane perpendicular to a defined direction relative to an axis of reference. The direction may be coincident with the axis of reference. The effective light-emitting surface may include a portion of the illuminated LEDs 20 that direct light to a photometric test pattern. By way of a non-limiting example, the LLAR may be between 1,250 and 1,230 square millimeters (mm^2). More preferably, the LLAR may be between 2,200 and 7,500 mm^2. Even more preferably, the LLAR may be approximately 5,000 mm^2. However, it should be appreciated that the LLAR may be any other suitable area as well. As such, upon illumination of the first group 66 of LEDs 20, the LLAR of the tail light assembly 14 is instantaneously attained.

It should be appreciated that the photometric requirements may include, but should not be limited to a photometric intensity of the illuminated LEDs 20. The photometric intensity of the illuminated LEDs 20 may be a measure of wavelength-weighted power emitted by the illuminated LEDs 20 in a direction per unit solid angle, based on the luminosity function, which is a standardized model of the sensitivity of the human eye. The photometric intensity is a measure of luminance of the light source, i.e., the illuminated LEDs 20, when viewed from any particular direction.

Figure 4:
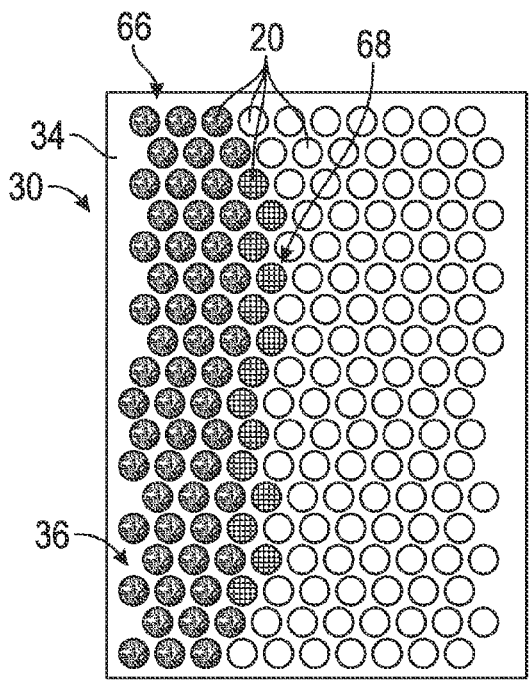
Figure 5:
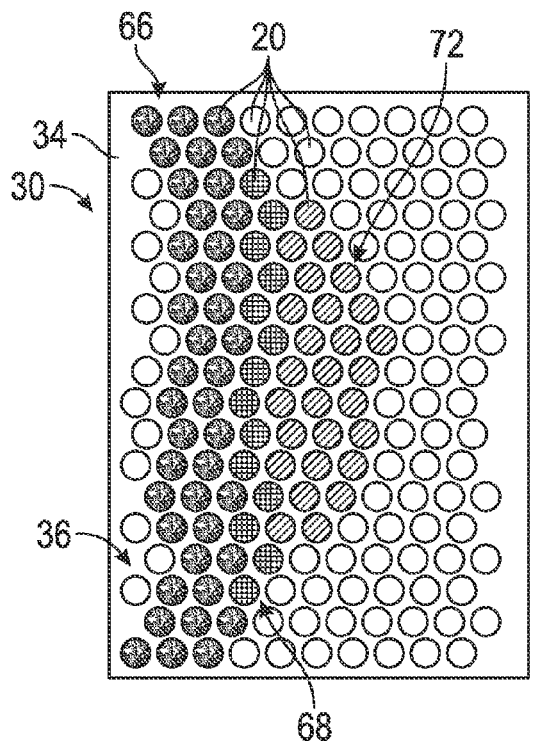

Referring now to FIG. 4, after a predefined length of time, the sequence may proceed, whereby the control board 40 transits a subsequent illumination signal (arrow $S_{62}$) to each of the LEDs 20 of a second group 68 of LEDs 20. In response to receiving the subsequent illumination signal (arrow $S_{62}$), each of the LEDs 20 of the second group 68 illuminates. At least one LED 20 within the second group 68 is disposed in adjacent relationship to at least one of the LEDs 20 within the first group 66. The first group 66 and second group 68 may be simultaneously illuminated for a predefined length of time. In one embodiment, the illumination of the second group 68 may also be sufficient to meet the LLAR and/or the photometric requirement. As such, once the second group 68 is illuminated, up to, and including, all of the illuminated LEDs 20 within the first group 66 may be subsequently turned off in response to the control board 40 sending a termination signal (arrow $S_{64}$) to the respective illumination signals (arrow $S_{62}$), while the illumination of the second group 68 continues to satisfy the LLAR and/or the photometric requirement. Alternatively, the second group 68 may not be sufficient to meet the LLAR and/or the photometric requirement. By way of a non-limiting example, the second group 68 of LEDs 20 is a single LED 20 or a quantity which is less than a quantity of the LEDs 20 required to meet the LLAR and/or the photometric requirement. In this scenario, once the second group 68 is illuminated, no more than a corresponding number of the illuminated LEDs 20 within the first group 66 of LEDs 20 may be turned off, as illustrated in FIG. 5, in response to the control board 40 sending a termination signal (arrow $S_{64}$) to the LEDs 20. This ensures the LLAR and/or the photometric requirement is constantly maintained during the progression of the lighting sequence.

Referring now to FIG. 5, after another predefined length of time, the lighting sequence proceeds, whereby the control board 40 sends another subsequent illumination signal (arrow $S_{62}$) to each of the LEDs 20 of a third group 72 of LEDs 20. At least one LED 20 within the third group 72 of LEDs 20 is in adjacent relationship to at least one LED 20 of the second group 68 of the LEDs 20. The LEDs 20 of the first and/or the second groups 68 of the LEDs 20 and the third group 72 of the LED 20(s) may be simultaneously illuminated for a predefined length of time. In one embodiment, the number of LEDs 20 illuminated in the third group 72 of LEDs 20 may also be sufficient to meet the LLAR and/or the photometric requirement. As such, once the third group 72 is illuminated, up to, and including, all of the illuminated LEDs 20 within the first and/or the second groups 68 may be subsequently turned off in response to the control board 40 sending a plurality of termination signals (arrow $S_{64}$), while still satisfying the LLAR and/or the photometric requirement. However, when the number of LEDs 20 illuminated within the third group 72 is not sufficient to meet the LLAR and/or the photometric requirement, up to only a corresponding number of the illuminated LEDs 20 within the first and/or second groups 66, 68 may be turned off, in response to the control board 40 sending a plurality of termination signals (arrow $S_{64}$), to thus ensure the LLAR and/or the photometric requirement is constantly maintained, as illustrated in FIG. 6.

Referring to FIG. 7, after another predefined length of time, the illumination sequence may proceed, whereby the control board 40 sends another subsequent illumination signal (arrow $S_{62}$) to each of the LEDs 20 of a fourth group 74 of LEDs 20. In response to receiving the subsequent illumination signal (arrow $S_{62}$), each of the LEDs 20 of the fourth group 74 illuminates. At least one LED 20 within the fourth group 74 is disposed in adjacent relationship to at least one LED 20 of the third group 72. The LEDs 20 of the first, second, and/or the third groups 66, 68, 72 and the LED(s) 20 of the fourth group 74 may be simultaneously illuminated for a predefined length of time. In one embodiment, the number of LEDs 20 illuminated in the fourth group 74 of LEDs 20 may also be sufficient to meet the LLAR and/or the photometric requirement. As such, once the fourth group 74 of the LEDs 20 is illuminated, up to, and including, all of the illuminated LEDs 20 within the first, second and/or the third groups 66, 68, 72 may be turned off, while still satisfying the LLAR and/or the photometric requirements. However, when the number of LEDs 20 illuminated within the fourth group 74 is not sufficient to meet the LLAR and/or the photometric requirement, up to only a corresponding number of the illuminated LEDs 20 within the first, second, and/or third groups 66, 68, 72 may be turned off to ensure the LLAR and/or the photometric requirement is constantly maintained.

Referring to FIG. 8, after yet another predefined length of time, the illumination sequence may proceed by illuminating a fifth group 76 of LEDs 20. The illumination of a fifth group 76 of LEDs 20 would be subsequent to the illumination of the fourth group 74, and also subsequent to the turning off of a plurality of the LEDs 20 of at least one of the first, second, third, and fourth groups 74. As such, the LEDs 20 that remain illuminated are sufficient to ensure the LLAR and/or the photometric requirement is constantly maintained. It should be appreciated that there may be any desired number of groups of LEDs 20 illuminated Further, while FIGS. 3-8 illustrate only six "frames" of the lighting sequence with five groups of LEDs 20, it should be appreciated that the lighting sequence may consist of more or less frames and/or more or less groups of LEDs 20 to simulate the desired motion. In the embodiment illustrated in FIGS. 3-8, the illumination and subsequent turning off of the various LEDs 20 simulates a wave that oscillates and propagates from one area of the base plate 34 to another area. It should be appreciated that the lighting sequence may include additional frames such that the wave continues and completes the propagation across the base plate 34. It should also be appreciated that other movements and or the propagation of differently shaped waves may be simulated, as well. These movements may be configured to move nonlinearly, i.e., not as a single straight line.

As the LED 20 sequence of FIGS. 3-8 illustrates, the LEDs 20 are illuminated and turned off to simulate movement that progresses from one side toward an opposite side of the base plate 34. In the embodiment shown, the movement may progress across the base plate 34 in a direction the vehicle 10 intends to turn. It should be appreciated that the illumination sequence may be configured such that the movement may begin in any area of the base plate 34 and simulate movement in any desired direction(s).

Once the last group of the LEDs 20 is illuminated, the LEDs 20 of the last group may remain illuminated for a predefined length of time. In one embodiment, once the predefined length of time is achieved, the first group 66 of the LEDs 20 may be subsequently illuminated such that the first group 66 of the LED 20 and the last group of the LEDs 20 are illuminated simultaneously in spaced relationship to one another for another predefined length of time. Alternatively, in another embodiment, once the predefined length of time is achieved, the last group of the LEDs 20 turns off such that none of the LEDs 20 are illuminated in the tail light assembly 14, where the illumination sequence may be reinitiated such that the first group 66 is illuminated once again.

Additionally, while the illumination of the LEDs 20 should be instantaneous, the LEDs 20 may be turned off more slowly. More specifically, the LEDs 20 may be slowly faded or dimmed until they turn off, as illustrated at 78 in FIG. 6.

Figure 11:
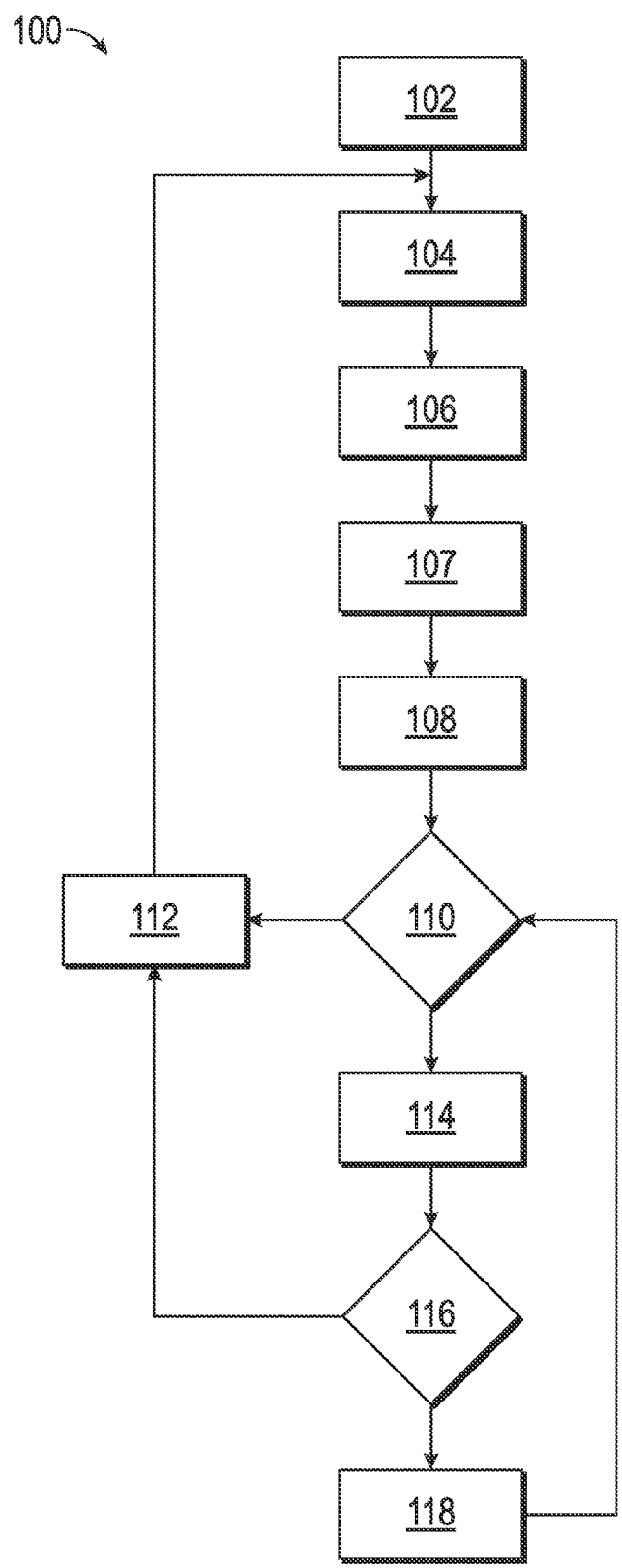
FIG. 11 is a flow chart describing a method for operating the lighting assembly of FIGS. 1 and 2.

Referring to FIG. 11, an example method 100 for using a lighting assembly 30, as described above, is shown. Once again, for illustrative consistency the tail light assembly 14 of FIG. 2 is treated herein below as the example lighting assembly 30. Those of ordinary skill in the art will appreciate that the same or a similar approach may be employed in other vehicle lighting assemblies 30 and the like.

Method 100 begins with step 102, wherein at least one predetermined lighting sequence is recorded, typically in the memory 54 of the controller 50 shown in FIG. 10. It should be appreciated, however, that the predetermined lighting sequence may also be stored directly on a memory 54 chip of the control board 40 shown in FIG. 2. The method 100 proceeds to step 104 once one or more lighting sequences have been recorded.

Step 104 may include receiving the activation signal (arrow $S_{22}$) of FIG. 10 via the transceiver 57. The method 100 proceeds to step 106 once this has occurred.

Step 106 may include initiating a lighting sequence from the memory 54. Once the lighting sequence is initiated, the method 100 proceeds to step 107.

Step 107 may include sending a sequence signal (arrow 11) from the controller 50 to the control board 40. Once the sequence signal (arrow 11) is being sent, the method proceeds to step 108.

Step 108 may include individually addressing the first group 66 with the control board 40. More specifically, an initial illumination signal (arrow $S_{62}$) is sent to each LEDs 20 of the first group 66 of LEDs 20. In response, each LED 20 of the first group 66 is illuminated, where the illumination of the LEDs 20 of the first group 66 meets the LLAR and/or the photometric requirement. Once the LEDs 20 of the first group 66 are illuminated, the method 100 proceeds to step 110.

Step 110 may entail determining if the sequence signal (arrow 11) is still being received by the control board 40. If the activation signal (arrow $S_{22}$) is not still being received, then the method proceeds to step 112.

Step 112 may entail sending a termination signal (arrow $S_{64}$) to each of the LEDs 20 such that the LEDs 20 all turn off Once the LEDs 20 are turned off, the method returns to step 102 and proceeds as set forth above.

With reference again to step 110, if the determination is made that the activation signal (arrow $S_{22}$) is still being received by the control board 40, the method proceeds to step 114. Step 114 may entail the control board 40 sending a subsequent illumination signal (arrow $S_{62}$) to each LED 20 of the second group 68. In response, each of the LEDs 20 of the second group 68 is illuminated. Once the LEDs 20 of the second group 68 are illuminated, the method proceeds to step 116.

Step 116 may include determining if the activation signal (arrow $S_{22}$) is still being received by the control board 40. If the activation signal (arrow $S_{22}$) is not being received by the control board 40, the method proceeds to step 112, and the method proceeds as described above. However, if the activation signal (arrow $S_{22}$) is still being received by the control board 40, the method proceeds to step 118.

Step 118 may entail sending a termination signal (arrow $S_{64}$) to one or more of the preceding LEDs 20, based on the lighting sequence that is prerecorded in the memory 54. The corresponding LEDs 20 turn off in response to the termination signal (arrow $S_{64}$). Once the preceding LEDs 20 are turned off, the LEDs 20 that remain illuminated provide enough lamination to continue to meet the LLAR and/or the photometric requirement. After step 118, the method returns to step 110, where the method repeats as described above, following the sequence prerecorded in the memory 54. Collectively, the on/off pattern of all of the LEDs 20, shown in FIGS. 3-8, presents a dynamic animation.

The various embodiments described above relate to the tail light assembly 14 shown in FIGS. 1 and 2. Other lighting assemblies 30 may be used in lieu of the tail light assemblies 14.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A tail light assembly comprising:
   a lighting assembly including:
      a base plate presenting an attachment surface;
      a plurality of light-emitting diodes (LEDs) arranged on the attachment surface;
   a control board electrically connected to each of the LEDs;
   a controller including a memory, wherein a predetermined lighting sequence is recorded in the memory;
   wherein the controller is operable for:
      receiving an activation signal from a device;
      initiating the predetermined lighting sequence from the memory;
      sending an illumination signal to each LED of a first group of the plurality of the LEDs to thereby illuminate the first group of the LEDs;
      wherein the illumination of the first group of the LEDs meets at least one of a luminous lens area requirement and a photometric requirement;
      sending an illumination signal to each LED of a second group of the plurality of the LEDs to thereby illuminate the second group of the LEDs; and sending a termination signal to at least one of the LEDs of the first group of the LEDs, subsequent to the illumination of the second group of the LEDs, to thereby turn off the at least one of the LEDs of the first group of the LEDs such that remaining illuminated LEDs continuously meet the at least one of the luminous lens area requirement and the photometric requirement.

2. A tail light assembly, as set forth in claim 1, wherein the plurality of LEDs are arranged on the attachment surface of the base plate to present an amorphous pattern.

3. A tail light assembly, as set forth in claim 1, wherein the base plate includes a perimeter that is non-linear and undulates to form an amorphous shape.

4. A tail light assembly, as set forth in claim 1, wherein at least one LED of the second group of the LEDs is illuminated in adjacent relationship to at least one LED of the first group of the LEDs.

5. A tail light assembly, as set forth in claim 4, wherein the combination of the illuminated first group and second group of the LEDs presents a shape that is nonlinear.

6. A tail light assembly, as set forth in claim 4, wherein the control board is further defined as being operable for:
sending an illumination signal to each LED of a third group of the plurality of the LEDs to thereby illuminate the third group of the LEDs; and
sending a termination signal to at least one of the LEDs of at least one of the first group and/or the second group, subsequent to the illumination of the third group, to thereby turn off the at least one of the LEDs of the at least one of the first group and the second group such that the remaining illuminated LEDs continuously meet the at least one of the luminous lens area requirement and the photometric requirement.

7. A tail light assembly, as set forth in claim 6, wherein at least one LED of the third group of the LEDs is illuminated in adjacent relationship to at least one LED of the second group of the LEDs.

8. A tail light assembly, as set forth in claim 6, wherein the at least one LED of the at least one of the first group is dimmed until the at least one light of the at least one of the first group is turned off; and
wherein the at least one LED of the at least one of the first group and the second group is dimmed until the at least one LED of the at least one of the first group and the second group is turned off.

9. A tail light assembly, as set forth in claim 1, further comprising a plurality of wires electrically connecting each of the LEDs to the control board.

10. A method of illuminating a plurality of light-emitting diodes (LEDs) in a tail light assembly to simulate motion, the method comprising:
recording at least one predetermined lighting sequence in a memory;
receiving an activation signal from a device;
sending an illumination signal to each LED of a first group of the plurality of the LEDs to thereby illuminate the first group of the LEDs;
wherein the illumination of the first group of the LEDs meets a at least one of a luminous lens area requirement and a photometric requirement;
sending an illumination signal to each LED of a second group of the plurality of the LEDs to thereby illuminate the second group of the LEDs; and
sending a termination signal to at least one of the LEDs of the first group of the LEDs, subsequent to the illumination of the second group of the LEDs, to thereby turn off the at least one of the LEDs of the first group of the LEDs such that remaining illuminated LEDs continuously meet the at least one of the luminous lens area requirement and the photometric requirement.

11. A method, as set forth in claim 10, wherein at least one LED of the second group of the LEDs is illuminated in adjacent relationship to at least one LED of the first group of the LEDs.

12. A method, as set forth in claim 11, wherein a combination of the illuminated first group and the illuminated second group of the LEDs presents a shape that is nonlinear.

13. A method, as set forth in claim 11, further comprising:
sending an illumination signal to each LED of a third group of the plurality of the LEDs to thereby illuminate the third group of the LEDs; and
sending a termination signal to at least one of the LEDs of the at least one of the first group and the second group, subsequent to the illumination of the third group, to thereby turn off the at least one of the LEDs of the at least one of the first group and the second group such that the remaining illuminated LEDs continuously meet the at least one of the luminous lens area requirement and the photometric requirement.

14. A method, as set forth in claim 13, wherein at least one LED of the third group of the LEDs is illuminated in adjacent relationship to at least one LED of the second group of the LEDs.

15. A method, as set forth in claim 14, wherein the at least one LED of the at least one of the first group of the LEDs is dimmed until the at least one light of the at least one of the first group of the LEDs is turned off; and
wherein the at least one LED of the at least one of the first group and/or the second group of the LEDs is dimmed until the at least one LED of the at least one of the first group and the second group of the LEDs is turned off.

16. A method, as set forth in claim 10, further comprising sending a sequence signal from a controller to the control board;
initiating a lighting sequence from a memory in response to receiving the sequence signal from the controller; and
sending an activation signal from the controller to the control board.

17. A method of illuminating a plurality of light-emitting diodes (LEDs) in a tail light assembly to simulate motion, the method comprising:
recording at least one predetermined lighting sequence in a memory;
receiving an activation signal from a device;
sending an illumination signal to a first group of the plurality of the LEDs to thereby illuminate the first group of the LEDs;
wherein the illumination of the first group of the LEDs meets at least one of a luminous lens area requirement and a photometric requirement;
sending a subsequent illumination signal to a second group of the plurality of the LEDs to thereby illuminate the second group of the LEDs; and
sending a termination signal to at least one of the LEDs of the first group, subsequent to the illumination of the second group, to thereby turn off the at least one of the LEDs of the first group such that remaining illuminated LEDs of the at least one of the first group and second group continues to meet the at least one of the luminous lens area requirement and the photometric requirement;
sending another subsequent illumination signal to a third group of the LEDs to illuminate the LEDs of the third group;

wherein the illumination signal is sent to the third group of the LEDs after the illumination signal is sent to the second group of LEDs; and sending a subsequent termination signal to at least one of the LEDs of at least one of the first group and the second group, subsequent to the illumination of the LEDs of the third group, to thereby turn off the at least one of the LEDs of the at least one of the first group and the second group such that the remaining illuminated LEDs meet the at least one of the luminous lens area requirement and the photometric requirement.

18. A method, as set forth in claim 17, wherein the first group, the second group, and the third group of LEDs are illuminated and turned off to display a propagating wave.

* * * * *